(12) United States Patent
Ishizuka et al.

(10) Patent No.: US 9,272,866 B2
(45) Date of Patent: Mar. 1, 2016

(54) CONVEYANCE DEVICE, CONVEYANCE DEVICE CONTROL METHOD, AND COMPUTER PROGRAM PRODUCT

(71) Applicants: Natsuko Ishizuka, Kanagawa (JP); Tatsuya Watahiki, Kanagawa (JP)

(72) Inventors: Natsuko Ishizuka, Kanagawa (JP); Tatsuya Watahiki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/199,286

(22) Filed: Mar. 6, 2014

(65) Prior Publication Data

US 2014/0265111 A1  Sep. 18, 2014

(30) Foreign Application Priority Data

Mar. 14, 2013 (JP) ................... 2013-051172
May 16, 2013 (JP) ................... 2013-103914

(51) Int. Cl.
*B65H 7/02* (2006.01)
*H02P 6/16* (2006.01)
*H02P 23/00* (2006.01)

(52) U.S. Cl.
CPC .. *B65H 7/02* (2013.01); *H02P 6/16* (2013.01); *H02P 23/0068* (2013.01); *B65H 2511/20* (2013.01); *B65H 2511/22* (2013.01); *B65H 2513/11* (2013.01); *B65H 2513/53* (2013.01); *B65H 2553/51* (2013.01); *B65H 2555/252* (2013.01); *B65H 2557/33* (2013.01); *B65H 2601/12* (2013.01)

(58) Field of Classification Search
CPC ............... B65H 7/00; B65H 2557/262; B65H 2557/264; B65H 2513/53; B65H 2513/50; B65H 7/02; B65G 2553/51
See application file for complete search history.

(56) References Cited

U.S. PATENT DOCUMENTS

2009/0057997 A1* 3/2009 Hatada et al. ................. 271/270
2012/0251213 A1  10/2012 Iesaki

FOREIGN PATENT DOCUMENTS

| JP | 2007-316608 | 12/2007 |
|---|---|---|
| JP | 2009-048239 | 3/2009 |
| JP | 2009-073181 | 4/2009 |
| JP | 2012-177971 | 9/2012 |
| JP | 2012-215947 | 11/2012 |

* cited by examiner

*Primary Examiner* — Michael McCullough
(74) *Attorney, Agent, or Firm* — Harness, Dickey & Pierce, P.L.C.

(57) ABSTRACT

Provided is a conveyance device that includes: a conveyance unit configured to convey a conveyance object; a motor configured to drive the conveyance unit; a sensor configured to detect a position of the conveyance object; an instruction unit configured to generate an instruction signal for conveying the conveyance object to a target position; and a control unit configured to control the motor by performing a speed feedback control and control the motor so as to cancel a delay between a time when the position of the conveyance object is detected and a time when the speed feedback control is reflected on the motor.

12 Claims, 11 Drawing Sheets

CONVEYANCE DEVICE, CONVEYANCE DEVICE CONTROL METHOD, AND COMPUTER PROGRAM PRODUCT

CROSS-REFERENCE TO RELATED APPLICATIONS

The present application claims priority to and incorporates by reference the entire contents of Japanese Patent Application No. 2013-051172 filed in Japan on Mar. 14, 2013 and Japanese Patent Application No. 2013-103914 filed in Japan on May 16, 2013.

BACKGROUND OF THE INVENTION

1. Field of the Invention

The present invention relates to, for example, a device configured to convey a conveyance object such as a piece of paper to a target position.

2. Description of the Related Art

A conveyance device configured to convey a conveyance object such as a piece of paper or a piece of paper currency to a target position is used in an image forming apparatus such as a printer or another apparatus.

Japanese Laid-open Patent Publication No. 2007-316608 discloses an image forming apparatus including a paper conveyance device. An objective of the image forming apparatus is to prevent the deterioration of the positional deviation correction or the phase adjustment accuracy while a plurality of latent image carriers drives at different linear velocities, by forming an image for detecting a positional deviation or an image for detecting a speed variation. Thus, the image forming apparatus forms an image for detecting a positional deviation or an image for detecting a speed variation while driving the latent image carriers at the same speed.

Japanese Laid-open Patent Publication No. 2012-177971 discloses a paper sheet processing apparatus configured to convey, for example, a sheet of paper current in a ticket vending machine. An objective of the paper sheet processing apparatus is to enable a reciprocating conveyance unit conveying a sheet of paper to appropriately stop at the target position even when the variation in the load or temperature of the motor changes, in response to the number of sheets of paper, an appropriate value to be set as the target value used for the control. Thus, the paper sheet processing apparatus corrects the target value every time when the motion of the reciprocating conveyance unit is controlled in such a way as to eliminate the positional deviation between the stop position and the target stop position using the predetermined reference detection position.

In order to improve the stop position accuracy in the control of the motor driving a conveyance roller configured to convey a print medium, Japanese Laid-open Patent Publication No. 2009-73181 discloses a technique to terminate a speed feedback control and perform a position feedback control when the number of remaining pulses to the target stop position becomes equal to or less than a threshold in the deceleration area.

To appropriately convey and stop a conveyance object such as a piece of paper at the target position, it is necessary to accurately control the revolution speed of the motor that drives a conveyer, for example, a roller. Japanese Laid-open Patent Publication No. 2012-177971 corrects the target value of the stop position of the reciprocating conveyance unit using the predetermined reference detection position. However, Japanese Laid-open Patent Publication 2012-177971 does not improve the controllability on the revolution speed of the motor. There is a problem in Japanese Laid-open Patent Publication No. 2009-73181 in that the period between the start of the position feedback control and the time when the conveyance object reaches the target stop position varies depending on the load of the motor because the position feedback control is performed based on the number of remaining pulses.

In light of the foregoing, an object of the present invention is to improve the controllability on the motor.

SUMMARY OF THE INVENTION

There is a need to at least partially solve the problems in the conventional technology.

According to one aspect of the present invention, provided is a conveyance device including: a conveyance unit configured to convey a conveyance object; a motor configured to drive the conveyance unit; a sensor configured to detect a position of the conveyance object; an instruction unit configured to generate an instruction signal for conveying the conveyance object to a target position; and a control unit configured to control the motor by performing a speed feedback control based on reference position information including the instruction signal, motor revolution speed information, position information about the conveyance object, and a reference position information including an installation position of the sensor, and control the motor so as to cancel a delay between a time when the position of the conveyance object is detected and a time when the speed feedback control is reflected on the motor.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
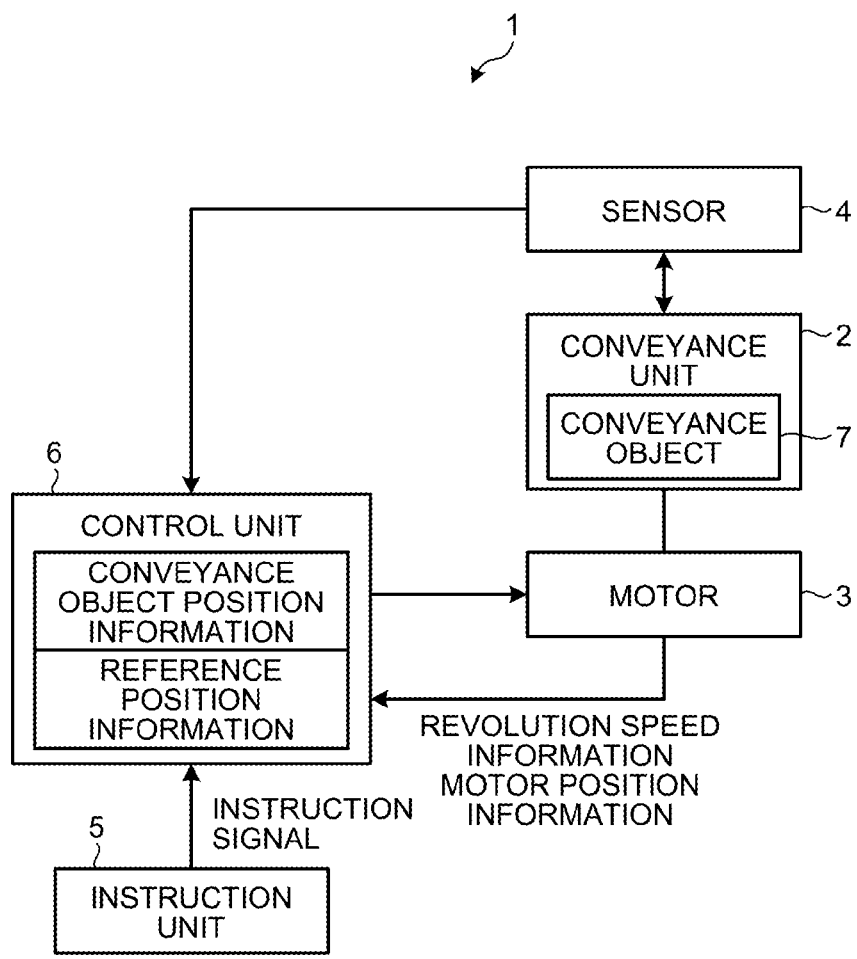
FIG. 1 is a diagram of the configuration of a conveyance device according to an embodiment of the present invention.

Hereinafter, the embodiment of the present invention will be described with reference to the appended drawings. FIG. 1 illustrates the basic configuration of a conveyance device 1 according to the present embodiment. The conveyance device 1 includes a conveyance unit 2, a motor 3, a sensor 4, an instruction unit 5, and a control unit 6.

The conveyance unit 2 is a mechanism configured to convey a conveyance object 7. The conveyance object 7 is, for example, a piece of paper. For example, a roller configured to convey a piece of paper in an image forming apparatus such as a printer, a copier, a fax, or a multi function printer (MFP), or a paper currency conveyance unit used in an automated teller machine (ATM) can be cited as an example of the conveyance unit 2.

The motor 3 is a mechanism configured to generate power for driving the conveyance unit 2. For example, a brushless motor capable of changing the revolution speed, revolution amount, revolution direction in response to the variation in the frequency of a control signal, voltage, or current supplied from outside can be cited as an example of the motor 3.

The sensor 4 is placed on a conveyance path for the conveyance object 7 and configured to detect the position of the conveyance object 7. Various sensors such an optical position sensor and an ultrasonic sensor can be used as the sensor 4. When the conveyance unit 2 or the motor 3 changes the position together with the conveyance object 7, detecting the conveyance unit 2 or the motor 3 can also detect the position of the conveyance object 7.

The instruction unit 5 is configured to generate an instruction signal to convey the conveyance object 7 to a predetermined target position. The instruction unit 5 is, for example, an application specific integrated circuit (ASIC) that operates according to a predetermined control program. Generally, an ASIC that determines the target position of the conveyance object 7, the operation of the conveyance unit 2, and the like according to the input operation by the user or the instruction from an upper control unit or the like to generate an instruction signal to the control unit 6 is assumed as the instruction unit 5.

The control unit 6 performs a speed feedback control on the motor 3 based on the instruction signal from the instruction unit 5, the information about the revolution speed of the motor 3 (revolution speed information) that is a feedback from the motor 3, the information about the position of the conveyance object 7 detected with the sensor 4 (conveyance object position information), and the reference position information including the installation position of the sensor 4 configured to detect the conveyance object 7. In the speed feedback control, the control unit 6 controls, for example, the revolution speed of the motor 3 so as to cancel the delay from the time when the conveyance object 7 (or the conveyance unit 2 or the motor 3) has passed through the installation position of the sensor 4 to the time when the contents of the control is reflected on the motor 3. The control unit 6 further performs a position feedback control on the motor 3 based on the information about the position (state) of the motor 3 (motor position information) that is a feedback from the motor 3 and the designated number of pulses that is a predetermined constant value when the difference between the position of the conveyance object 7 and the target position designated by the instruction signal becomes equal to or less than a threshold. In the position feedback control, the control unit 6 controls, for example, the revolution speed of the motor 3 such that the period from the time when the difference between the position of the conveyance object 7 and the target position becomes equal to or less than the threshold to the time when the conveyance object 7 reaches the target position is kept constant. Note that, needless to say, the control unit 6 may be configured to control the revolution amount, the revolution direction, the start or stop of revolution, or the like instead of the revolution speed of the motor 3. The control unit 6 is, for example, an ASIC that operates according to a predetermined control program.

Note that the instruction unit 5 and the control unit 6 may be implemented, for example, by causing a processing apparatus such as a central processing unit (CPU) to execute a program, namely, with software, may be implemented with hardware such as an integrated circuit (IC), or may be implemented with the combination of the software and the hardware.

The above-mentioned configuration controls the motor by the speed feedback control in consideration of the delay of the control using the fixed reference position information indicating the installation position of the sensor 4. This can control the operation of the conveyance unit 2 with a high degree of accuracy. When the difference between the position of the conveyance object 7 and the target position has become equal to or less than a threshold, the above-mentioned configuration also controls the motor 3 by the position feedback control using the predetermined designated number of pulses such that the period until the conveyance object 7 reaches the target position is kept constant. As described above, in the position feedback control, using the predetermined designated number of pulses instead of the number of remaining pulses indicating the difference between the position of the conveyance object 7 and the target position can secure the time when the conveyance object 7 reaches the target position.

Figure 2:
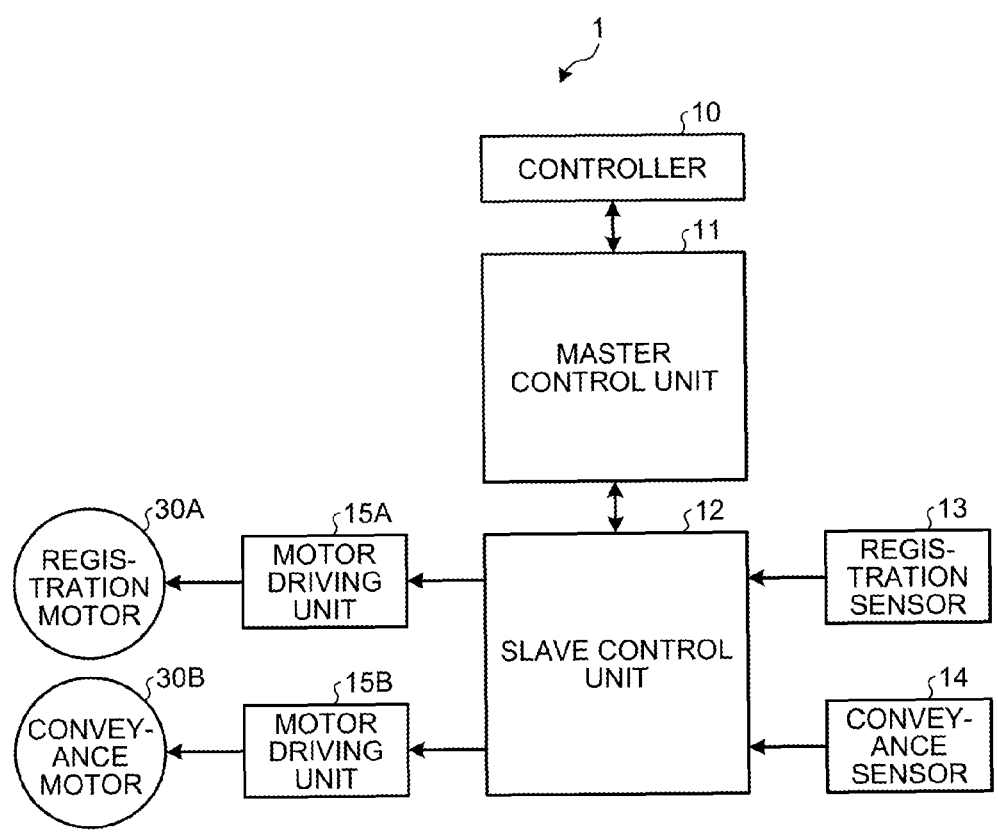
FIG. 2 is a diagram of an exemplary hardware configuration of the conveyance device according to the embodiment of the present invention.

FIG. 2 illustrates an exemplary hardware configuration of the conveyance device 1 according to the present embodiment. The conveyance device 1 according to the present example is used for a paper conveyance system in an image forming apparatus and includes a controller 10, a master control unit 11, a slave control unit 12, a registration sensor 13, a conveyance sensor 14, a motor driving unit 15A, a motor driving unit 15B, a registration motor 30A, and a conveyance motor 30B.

The controller 10 is an operation unit, for example, provided on the external surface of an image forming apparatus to receive the user operation for the printing instruction and output a request signal or the like. The master control unit 11 outputs an instruction signal according to the signal from the controller 10. The slave control unit 12 controls the motor driving units 15A and 15B based on the instruction signal, the output from the registration sensor 13, the output from the conveyance sensor 14 in order to control the registration motor 30A and the conveyance motor 30B.

The master control unit 11 is an embodiment of the instruction unit 5 and includes, for example, a CPU, a read only memory (ROM), and a random access memory (RAM) to operate the RAM as a work memory according to the program stored in the ROM in order to perform a predetermined process. The CPU in the master control unit 11 generates an instruction signal (command) in response to, for example, the request signal output from the controller 10 in order to output the instruction signal to the slave control unit 12. As described above, the master control unit 11 controls the whole of the image forming apparatus including the printing operation.

The slave control unit 12 is an embodiment of the control unit 6, and controls the motor driving units 15A and 15B that are connected through an interface (not illustrated in the drawings) according to the instruction signal from the master control unit 11. In the example in FIG. 2, the slave control unit 12 is connected to the motor driving unit 15A that drives the registration motor 30A for controlling the alignment of paper, and to the motor driving unit 15B that drives the conveyance motor 30B for conveying the paper. The slave control unit 12 controls the motor driving units 15A and 15B according to the instruction signal from the master control unit 11 so as to control the paper conveyance. The slave control unit 12 inputs the signal from each of the sensors such as the registration sensor 13 that detects the position of the piece of paper (or the position of the registration motor 30A when the motor 30A changes the position together with the piece of paper) in the registration unit, and the conveyance sensor 14 that detects the position of the paper (or the position of the conveyance motor 30B when the motor 30B changes the position together with the piece of paper) in the conveyance system.

The master control unit 11 and the slave control unit 12 include each an independent ASIC. Note that, as described above, an example in which a slave control unit 12 is connected to a master control unit 11 has been described. However, a plurality of slave control units 12 may be connected to a master control unit 11.

Figure 3:
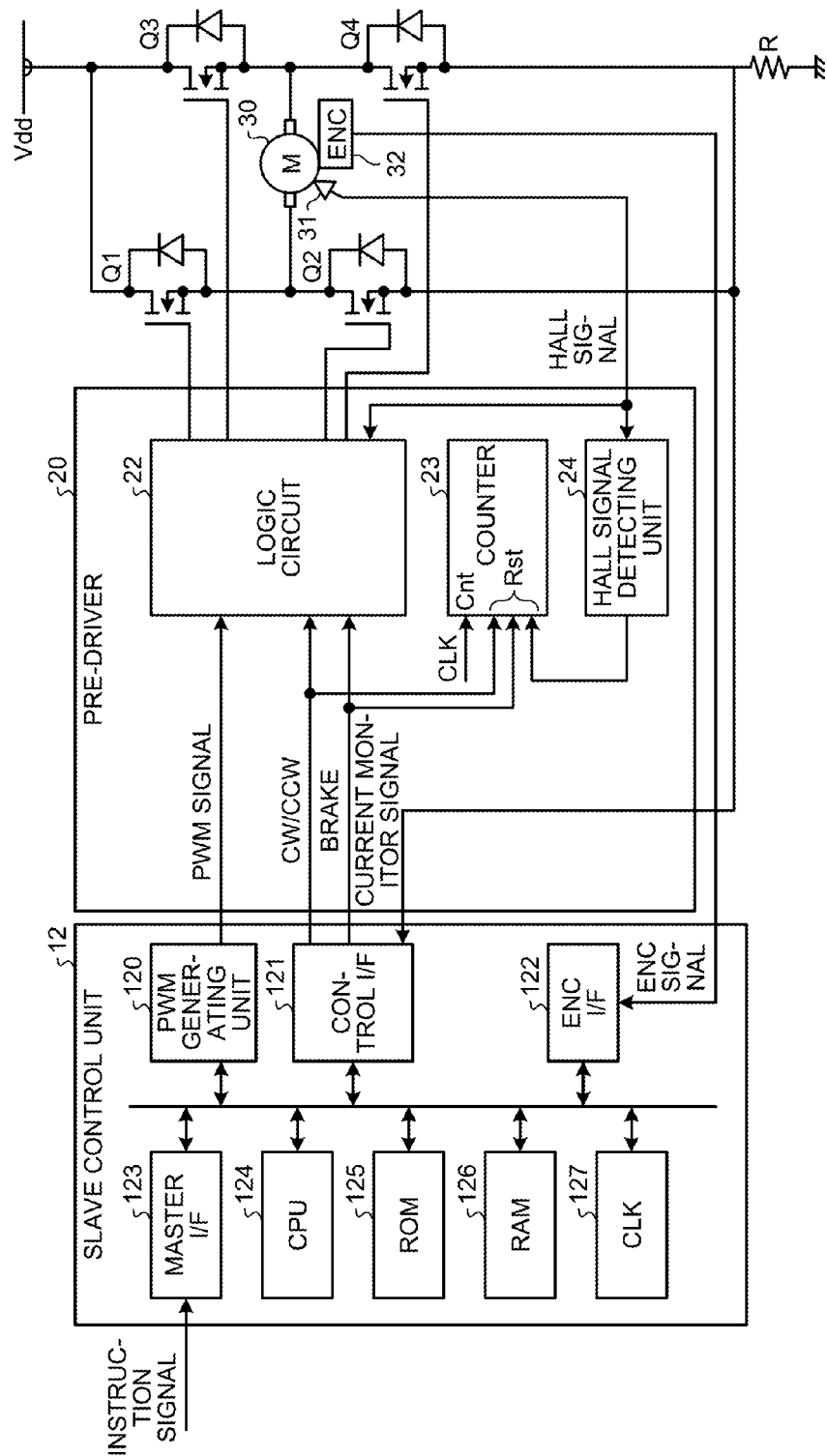
FIG. 3 is a diagram of an exemplary configuration of the motor driving system including a slave control unit according to the embodiment of the present invention.

FIG. 3 illustrates an exemplary driving system in the motor 3 including the slave control unit 12 according to the present embodiment. In FIG. 3, a motor driving unit 15 will be described as the representative example of the two motor driving units 15A and 15B illustrated in FIG. 2. Further, a motor 30 will be described as the representative example of the registration motor 30A and the conveyance motor 30B.

In the driving system of the motor 3, a pre-driver 20 outputs a driving signal to each of switching devices Q1 to Q4 based on the control signals (a PWM signal, a CW/CCW signal, and a BRAKE signal) output from the slave control unit 12 in order to control the revolution of the motor 30. The motor 30 according to the present embodiment is a brushless DC motor. The control signal output from the slave control unit 12 is the PWM signal.

The slave control unit 12 includes a PWM generating unit 120, a control I/F 121, an encoder (ENC) I/F 122, a master I/F 123, a CPU 124, a ROM 125, a RAM 126, and a clock generating unit (CLK) 127. These components are connected to each other through a bus so as to be capable of communicating with each other.

The clock signal generated with the clock generating unit 127 is used in the slave control unit 12 with being supplied to each component of the motor driving system through a path (not illustrated in the drawings).

The master I/F 123 is an interface to the master control unit 11. The master I/F 123 transmits the instruction signal output from the master control unit 11 to the CPU 124. The instruction signal includes the target speed, target position, revolution direction of the motor 30, and the activation request and stop request to the motor 30. The instruction signal may be a signal of a pulse or the like, or may be a signal transmitted as table information from the master control unit 11 to the slave control unit 12.

The PWM generating unit 120 generates a PWM signal for the duty ratio designated by the CPU 124. The control I/F 121 outputs a CW/CCW signal that controls the revolution direction of the motor 30 generated with the CPU 124 and a BRAKE signal that performs a brake control on the motor 30 in order to input a current monitor signal that monitors the current from the motor 30.

The encoder I/F 122 inputs an encoder signal (ENC signal) indicating the state of the motor 30 and output from the encoder (ENC) 32. The slave control unit 12 performs a feedback control based on the instruction signal output from the master control unit 11 and the encoder signal output from the encoder 32 in order to generate each of the control signals to be transmitted to the pre-driver 20.

The pre-driver 20 includes a logic circuit 22, a counter 23, and a hall signal detecting unit 24. The PWM signal output from the slave control unit 12 is input to the logic circuit 22. The hall signal output from a hall device 31 provided at the motor 30, the CW/CCW signal and BRAKE signal output from the slave control unit 12 are further input to the logic circuit 22.

The logic circuit 22 outputs a driving signal for driving the motor 30 based on the PWM signal output from the slave control unit 12, the hall signal output from the hall device 31, and the CW/CCW signal or BRAKE signal output from the slave control unit 12. In the present example, the logic circuit 22 drives the motor 30 using the driving signal with three phases U, V, and W. The hall signal is also output as a three-phase signal.

The motor 30 drives at a revolution speed according to the duty ratio of the PWM signal output from the slave control unit 12. For example, the motor 30 spins at the maximum speed when the duty ratio of the PWM signal is 100%, and stops when the duty ratio is 0%.

The hall signal detecting unit 24 detects the variation in the hall signal output from the hall device 31.

The counter 23 records a count value C obtained by counting predetermined clocks, for example, internal clocks CLK of the pre-driver 20. The counter 23 resets the count value C in response to the CW/CCW signal or the BRAKE signal. When receiving a detection signal indicating the detection of the variation in the hall signal from the hall signal detecting unit 24, the counter 23 resets the count value C.

The counter 23 compares the count value C with a threshold $C_{th}$. When the count value C exceeds a threshold $C_{th}$, the counter 23 determines that the motor 30 has been locked, and outputs a lock state detection signal indicating that the motor 30 is in a lock state to the logic circuit 22. Once receiving the lock state detection signal, the logic circuit 22 cuts the supply of the driving signal to the motor 30 in order to protect the motor 30, the driver circuit, and the like.

The motor 30 is driven, for example, with a driver circuit including an H bridge circuit including the switching devices Q1 to Q4 using a field-effect transistor (FET). Note that, although a two-phase H bridge circuit is illustrated as an example of the driver circuit in the present example, a pair of switching devices is added to the motor 30 when the motor is driven with three phases.

The driving signal with each of the phases U, V, and W output from the logic circuit 22 is input to the gate of each of the switching devices Q1 to Q4 and a driving voltage Vdd is supplied to the driver circuit. Controlling each of the switching devices Q1 to Q4 with the driving signal with each phase at a predetermined timing causes the motor 30 to rotate and drive.

The logic circuit 22 switches the output destinations of the three-phase motor driving signals according to the CW/CCW signal and changes the order of the hall signals inside. This can control the revolution direction of the motor 30 in a first or second direction. The logic circuit 22 short-circuits, for example, a terminal of the motor 30 according to the BRAKE signal. This can stop the motor 30.

The hall device 31 is embedded in the motor 30 to output a hall signal with an analog signal according to the intensity of magnetic field in the motor 30. The hall signal output from the hall device 31 is processed, for example, is amplified on a signal process circuit (not illustrated in the drawings) and then is input to the hall signal detecting unit 24 and the logic circuit 22.

The encoder 32 detects the state of the motor to output an encoder signal (the number of pulses according to the displacement amount of the rotation shaft) as the detection result. Specifically, the encoder 32 is provided, for example, on the shaft of the motor 30 to output a two-phase encoder signal with phases A and B according to the revolution of the motor 30. The encoder signal is input to the slave control unit 12. The CPU 124 in the slave control unit 12 can monitor the revolution speed, revolution amount, and revolution direction of the motor 30 based on the input encoder signal.

Note that the encoder 32 may be provided not only on the shaft of the motor 30 but also, for example, on a portion moving in synchronization with a control object to be drive-controlled by the motor 30. The revolution speed or the like of the motor 30 may be detected using the hall signal output from the hall device 31 instead of the encoder 32. In such a case, the encoder 32 working as a speed detection sensor can be omitted and this can reduce the cost.

Resistance R is shunt resistance for monitoring, the resultant current flowing through the motor 30 in the slave control unit 12. The monitor output for the current using the resistance R is input to the slave control unit 12.

Figure 4:
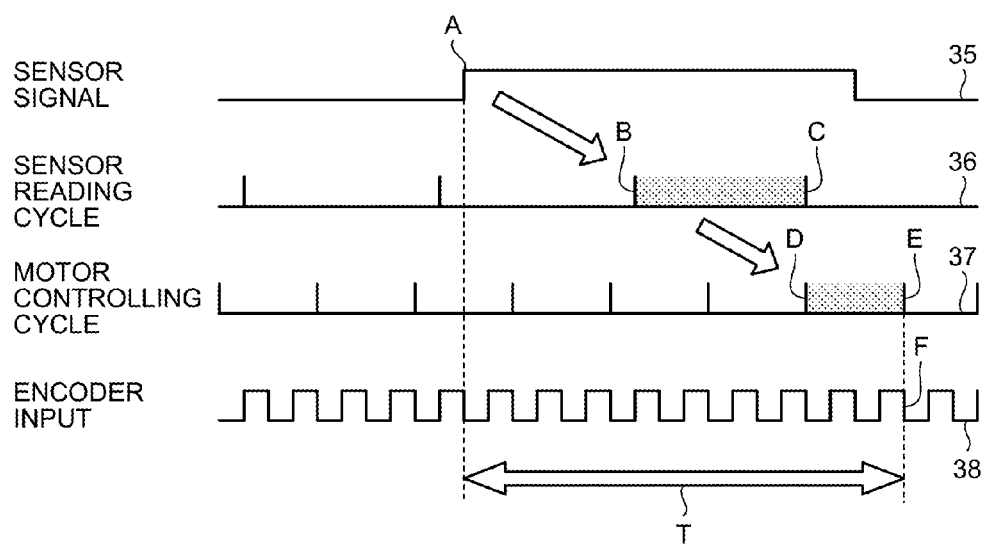
FIG. 4 is a diagram of an exemplary problem of the delay in the control of a general conveyance device.

FIG. 4 illustrates an exemplary problem of the delay in a control in a general conveyance device. A signal line 35 shows a detection signal of the sensor varying depending on the presence or absence of a conveyance object. A time point A shows the time point when the conveyance object has started passing through the sensor. A signal line 36 shows the cycle in which the sensor reads the variation in the signal line 35. The passing of the conveyance object is detected between time points B and C after the time point A. A signal line 37 shows the cycle of the motor control. The motor is controlled between time points D and E after the time point C in response to the passing of the conveyance object. A signal line 38 shows an input signal of the encoder. The control is reflected on the motor from a time point F after the time point E.

As described above, in a general conveyance device, a delay T occurs between the time when the conveyance object has passed through the sensor and the time when the control of the monitor actually starts. The delay T is reduced when the time point A is just before the start of the reading cycle from the time point B to the time point C. The delay T is extended when the time point A is just after the completion of the reading cycle. The delay T is reduced when the time point C is just before the start of the motor controlling cycle from the time point D to the time point E. The delay T is extended when the time point C is just after the completion of the controlling cycle.

Figure 5:
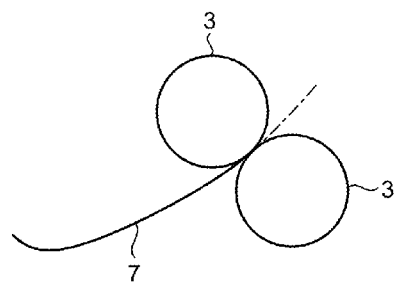
FIG. 5 is a diagram of an exemplary problem of the deviation of the stop position of the motor in a general conveyance device.
Figure 6:
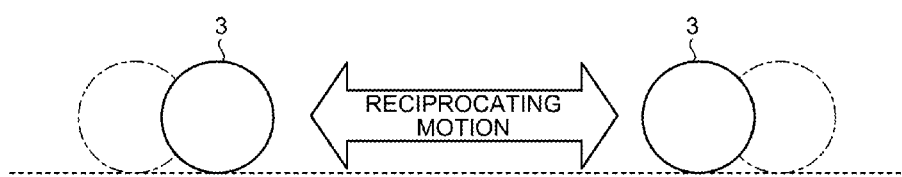
FIG. 6 is a diagram of an exemplary problem of the deviation of the stop position of the motor in a general conveyance device.

FIGS. 5 and 6 illustrate exemplary problem of the deviation of the stop position of the motor in a general conveyance device. FIG. 5 illustrates that the motor 3 is fixed on a predetermined place and the revolution of the motor conveys the conveyance object (a piece of paper) 7. FIG. 6 illustrates that the conveyance of a conveyance object (not illustrated in the drawing) changes the position of the motor 3. The solid line of the conveyance object 7 is an ideal stop position (target position) and the alternate long and short dash line is an undesirable stop position in FIG. 5. The solid line of the motor 3 is an ideal stop position (target position) and the alternate long and short dash line is an undesirable stop position in FIG. 6.

Such an image forming apparatus often starts the acceleration just after the stop of the motor 3 to secure the productivity (the amount of print per unit of time). To secure the accuracy of print, for example, keeping the conveyance object 7 stopped at the target position as illustrated in FIG. 5 and reciprocating, between the two target positions, the motor 3 that changes the position as illustrated in FIG. 6 are required with a high degree of accuracy. To implement such operations, it is necessary to surely cause the conveyance object 7 or the motor 3 to reach each of the target positions within a predetermined time. Specifically, it is required that the target position (the target position in a controlling cycle: a profile target position) reaches the final target position illustrated with the solid line in FIG. 5 or 6 within a predetermined time. The profile target position is used as a base, for example, for generating a PWM control signal for controlling the motor 3. When the profile target position does not reach the target position within a predetermined time, it is difficult to start the acceleration just after the motor 3 has stopped. This reduces the productivity. Further, keeping the conveyance object 7 at an undesirable position causes the variation in amounts of slack of the pieces of paper. Reciprocating the motor 3 within an undesirable range causes the variation in operation start positions. These reduce the accuracy of print.

Figure 7:
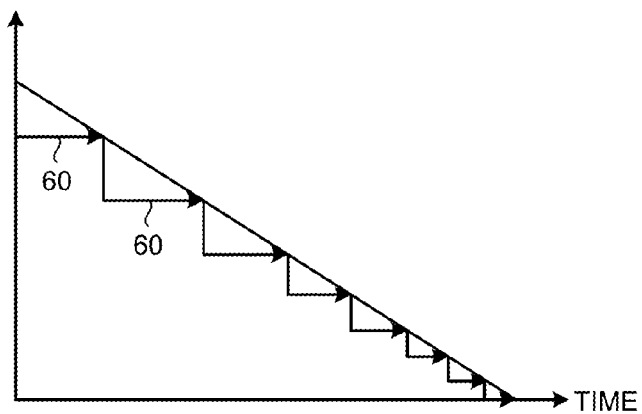
FIG. 7 is a diagram illustrating an exemplary problem in a position feedback control based on the number of remaining pulses in a general conveyance device while showing the relation between the time and the remaining pulses in the position feedback control.
Figure 8:
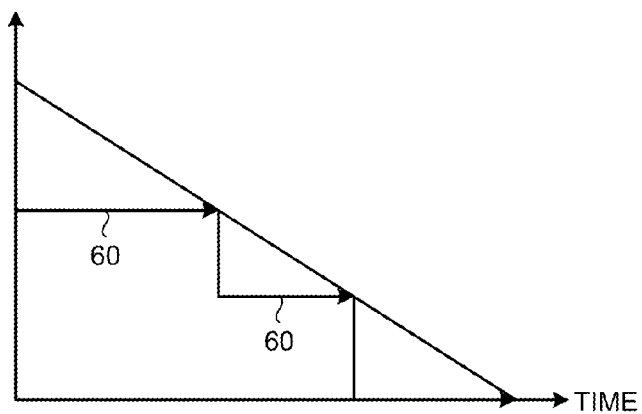
FIG. 8 is a diagram illustrating an exemplary problem in a position feedback control based on the number of remaining pulses in a general conveyance device while showing the relation between the time and the remaining pulses in the position feedback control.

FIGS. 7 and 8 illustrate an exemplary problem in a position feedback control based on the number of remaining pulses in a general conveyance device while showing the relation between the time and the number of remaining pulses in the position feedback control. The present example is on the assumption that the speed feedback control is stopped and a position feedback control is performed based on the number of remaining pulses when the number of remaining pulses until the conveyance object 7 or the motor 3 reaches the target position becomes equal to or less than a threshold. Specifically, for example, a profile target position is generated based on the number of remaining pulses when a PWM control signal for controlling the motor 3 is generated. FIGS. 7 and 8 illustrate the state after the position feedback control has started. In FIGS. 7 and 8, an arrow 60 shows the variation amount of the number of remaining pulses in a controlling cycle in a position feedback control. FIG. 7 illustrates that the case when the motor load is small and FIG. 8 illustrates that the case when the motor load is large.

While eight controlling cycles are required to cause the conveyance object 7 or the motor 3 to reach the target position when the motor load is small as illustrated in FIG. 7, three controlling cycles are required to cause the conveyance object 7 or the motor 3 to reach the target position when the motor load is large as illustrated in FIG. 8. The small motor load makes the motion of the motor 3 fast (increases the reaction). This facilitates the current position to proceed. The large motor load slows the motion of the motor (reduces the reaction). This makes the current position difficult to proceed. When a position feedback control is performed based on the number of remaining pulses as described above (a profile target position is generated), the number of controlling cycles required to cause the conveyance object 7 or the motor 3 to reach the target position varies depending on the motor load. Accordingly, this causes a problem in that it is difficult to ensure the period from the time when the position feedback control has been started to the time when the conveyance object 7 or the motor 3 reaches the target position. The uncertainness of the period until the conveyance object 7 or the motor 3 reaches the target position causes the decrease in the productivity and the accuracy of print as described above.

Figure 9:
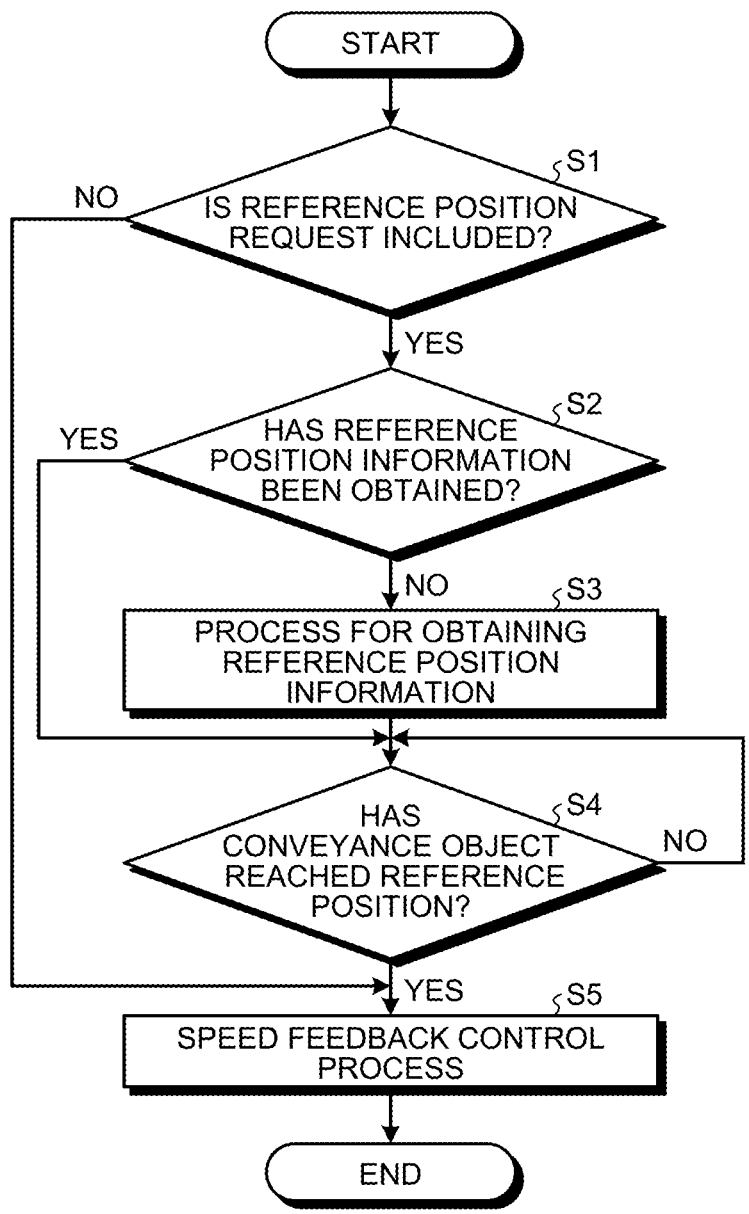
FIG. 9 is a flowchart describing an exemplary flow of the control on the motor revolution speed in the embodiment of the present invention.

FIG. 9 illustrates the exemplary flow of a revolution speed control of the motor 3 in the present embodiment. First, the control unit 6 (the slave control unit 12) determines whether the instruction signal from the instruction unit 5 (the master control unit 11) includes a request for the change of the speed of the motor 3 (30, 30A, 30B) based on the reference position information or, namely, the information indicating the installation position of the sensor 4 (13, 14) (step S1). When the request for the speed control based on the reference position information is not included in step S1 (No), the speed control is appropriately performed, for example, based on the default data of the relation among the target position of the conveyance object 7, the driving amount of the motor 3, and the travel distance of the conveyance object 7 (step S5).

Conversely, when the request for the speed control based on the reference position information is included in step S1 (Yes), it is determined whether the reference position information has been obtained (step S2). For example, it is determined whether the reference position information indicating the installation position of the sensor 4 configured to detect the conveyance object 7 is stored in the RAM 126 of the slave control unit 12. When the reference position information has not been obtained (No) in step S2, the process for obtaining the reference position information about the sensor 4 is performed (step S3). It is considered that the process for obtaining the reference position information can be, for example, a process in which a table in which the identification numbers of the sensors 4 are linked to the reference position information is stored in the ROM in order to extract appropriate reference position information using the identification number information output from the sensor 4 as a key, a process in which each of the sensors 4 stores its own reference position information in order to appropriately output the information to the control unit 6, or a process in which interrupt is generated at the reference position based on the position information obtained from the ENC 32 (see FIG. 3).

After that, it is determined whether the conveyance object 7 has reached the reference position (the installation position of the sensor 4) (step S4). When the conveyance object 7 has reached the reference position (Yes), a speed feedback control is performed based on the instruction signal including the target position, the revolution speed information that is the feedback from the motor 3, the position information of the conveyance object 7 obtained from the sensor 4 and the reference position information to control the revolution speed of the motor 3 so as to cancel the delay T (step S5).

As described above, the speed control of the motor 3 in consideration of the fixed reference position information based on the installation position of the sensor 4 can convey the conveyance object 7 with a high degree of accuracy. The speed control in consideration of the reference position information can also perform the control for cancelling the delay T between the time when the conveyance object 7 has passed through the sensor 4 and the time when the control of the motor 3 actually starts (see FIG. 4) with a high degree of accuracy.

Figure 10:
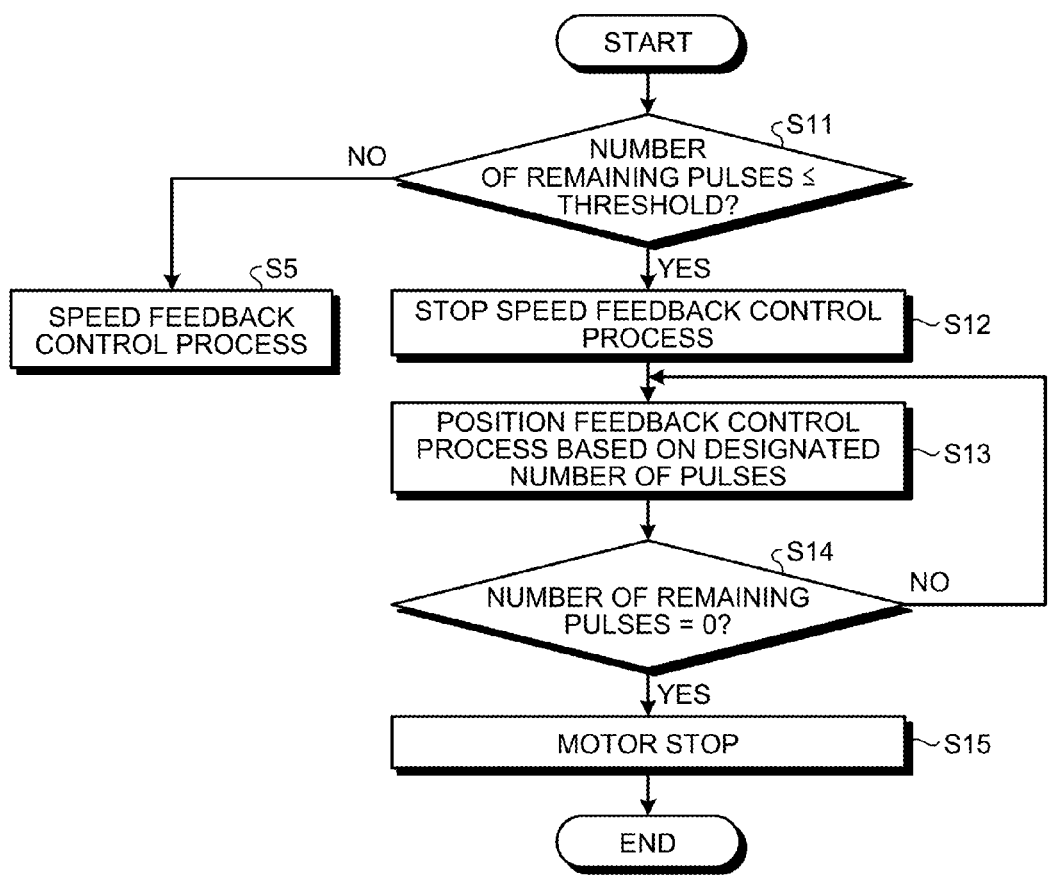
FIG. 10 is a flowchart describing an exemplary flow of the control on the stop position of the motor in the embodiment of the present invention.

FIG. 10 illustrates the exemplary flow of a stop position control of the motor 3 in the present embodiment. The routine is performed at the implementation of the speed feedback control process in step S5. First, the control unit 6 (the slave control unit 12) determines whether the number of remaining pulses obtained from the feedback signal from the motor 3 (the ENC signal output from the ENC 32) and the target position is equal to or less than a threshold (step S11). When the number of remaining pulses is not equal to or less than the threshold (No), the process goes back to the speed feedback control process (step S5).

Conversely, when the number of remaining pulses is equal to or less than the threshold (Yes) in step S11, the speed feedback control process is stopped (step S12), and a position feedback control process based on a predetermined designated number of pulses is performed (step S13). After that, it is determined whether the number of remaining pulses has reached zero (step S14). When the number of remaining pulses has not reached zero (No), the process goes back to step S13. When the number of remaining pulses has reached zero (Yes), the motor 3 is stopped (step S15).

Figure 11:
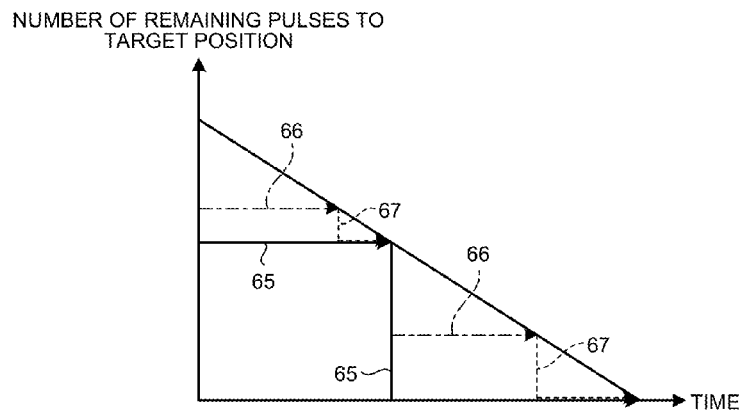
FIG. 11 is a diagram illustrating an exemplary relation between the time and the number of remaining pulses in a position feedback control based on the designated number of pulses in an embodiment of the present invention.

FIG. 11 illustrates an exemplary relation between the time and the number of remaining pulses in the position feedback control process based on the designated number of pulses. An arrow 65 shows the variation amount of the number of remaining pulses in a controlling cycle. An arrow 66 shows the designated number of pulses. An arrow 67 shows the position error. In the present example, the variation amount of the number of remaining pulses (the profile target position) in a controlling cycle is the sum of the designated number of pulses and the position error. In other word, the profile target position in a position feedback control process is generated based on the designated number of pulses and the position error. This can ensure the period until the profile target position reaches the target position because the number of controlling cycles required to cause the conveyance object 7 or the motor 3 to reach the target position (the ideal stop position) does not vary depending on the load of the motor 3.

Figure 12:
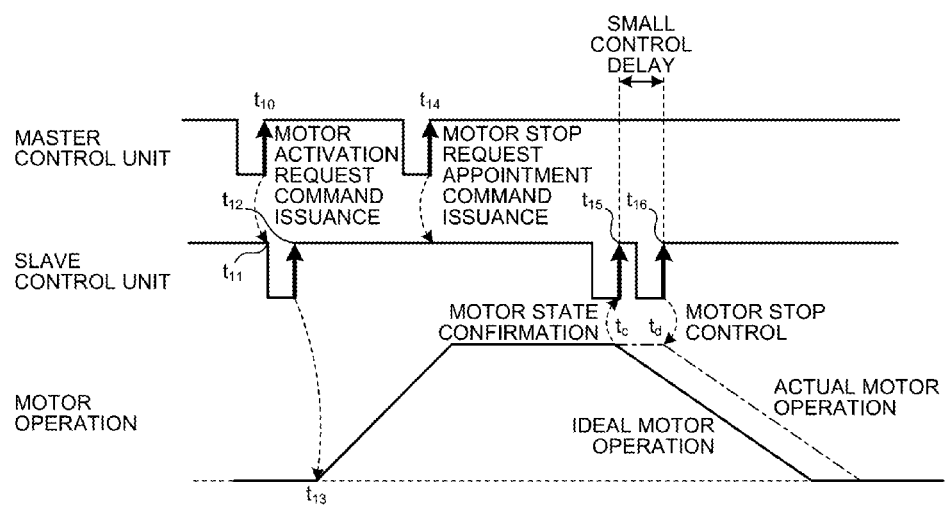
FIG. 12 is a diagram of a specific example of the drive control of the motor in an embodiment of the present invention.

FIG. 12 illustrates a specific example of the drive control of the motor 30 according to the present embodiment. The master control unit 11 issues a command (instruction signal) that requests the activation of the motor 30 to the slave control unit 12 at the time point $t_{10}$ in response to the control signal from the controller 10. The activation request command includes the designation of the revolution speed of the motor 30. The slave control unit 12 receives the activation request command at the time point $t_{11}$ and performs a control according to the activation request command at the time point $t_{12}$. The motor 30 is activated at the time point $t_{13}$. The motor 30 reaches the speed designated by the activation request command after a predetermined period has elapsed after the activation.

The master control unit 11 issues, to the slave control unit 12, an appointment command that requests the stop of the motor 30 at the time point $t_{14}$ after the time point $t_{10}$ when the activation request command has been issued to the motor 30. The appointment command sends an appointment to the slave control unit 12 in advance, for example, in such a way as to perform the control for stopping the motor 30 when the state of the motor 30 satisfies a predetermined condition. The appointment command is stored, for example, in the RAM 126 after the slave control unit 12 has received the command. For example, the appointment command designates the travel distance of the revolution of the motor 30 (the cumulative value of the revolution speed) as the condition for the state of the motor 30.

The slave control unit 12 monitors the state of the motor, the position of the conveyance object 7, and the like based on the sensor signal of each sensor and determines whether the motor 30 comes into the state as the appointment command indicates. More specifically, the slave control unit 12 accumulates the revolution angles of the motor 30 based on the encoder signal supplied from the encoder 32 in order to determine, based on the cumulative result, whether the travel distance of the revolution of the motor 30 has reached the travel distance designated by the appointment command.

Note that the distance is preferably determined in consideration of the travel period during the deceleration period of the motor 30. For example, the slave control unit 12 finds the travel distance of the revolution of the motor 30 during the period between the start of deceleration and the stop of the motor 30 based on the revolution speed of the motor 30 and the acceleration rate at the deceleration. Then, the control unit 12 determines whether the travel distance of the revolution of the motor 30 has reached the distance obtained by subtracting the found distance during the deceleration from the travel distance designated in the appointment command from the master control unit 11 (the deemed designated travel distance).

The slave control unit 12 uses the reference position information for a revolution speed control of the motor 30. For example, the slave control unit 12 measures the position and travel distance of the conveyance object 7 based on the reference position information of the sensor that has detected the conveyance object 7. This enables the slave control unit 12 to accurately determine whether the travel distance of the revolution of the motor 30 has reached the deemed designated travel distance. As described above, using the fixed reference position information indicating the installation position of the sensor, for example, for generating each parameter can improve the accuracy of the revolution speed control.

On the assumption that the travel distance of the revolution of the motor 30 has reached the deemed designated travel distance at the time point $t_c$, the slave control unit 12 confirms the state of the motor based on the encoder signal from the encoder 32. When determining that the travel distance of the revolution of the motor 30 has reached the deemed designated travel distance, the slave control unit 12 performs a control to stop the motor 30. The stop control implements the ideal operation of the motor 30 in which the motor starts decelerating at the time point $t_c$ when the travel distance of the motor has reached the deemed designated travel distance as illustrated in FIG. 6.

For example, the CPU 124 in the slave control unit 12 determines that the travel distance of the revolution of the motor 30 has reached the deemed designated travel distance at a time point $t_{15}$. The CPU 124 then performs a control to stop the motor 30 after the delay corresponding to the internal process of the slave control unit 12 (time point $t_{16}$). The stop control is performed by the output of the BRAKE signal from the CPU 124 through the control I/F 121 to the pre-driver 20 with controlling the PWM generating unit 120 to generate a PWM signal of which duty ratio is 0%, for example, at a time point $t_{16}$.

The stop control causes the motor to actually operate in such a way as to start decelerating at a time point $t_d$ just after the time point $t_{16}$ as illustrated with the alternate long and short dash line in FIG. 6. At that time, the control of the motor 30 generates a difference (delay) between time point $t_c$ when the ideal operation starts the deceleration and the time point $t_d$ when the actual operation starts the deceleration. However, the difference is small enough in comparison with the difference when the master control unit 11 confirms the state of the motor and notifies the confirmation result to the slave control unit 12 without issuance of the appointment command.

Note that the control program executed in the conveyance device 1 according to the present embodiment is preferably provided while being incorporated in the ROM 125 in advance. The control program may be a file in an installable or executable form and recorded in a computer-readable recording medium such as a CD-ROM, a flexible disk (FD), a CD-R, or a digital versatile disk (DVD). The control program may also be stored on the computer connected to a network such as the Internet such that the control program may be downloaded and provided through the network. The control program may also be provided or distributed through a network such as the Internet.

Figure 13:
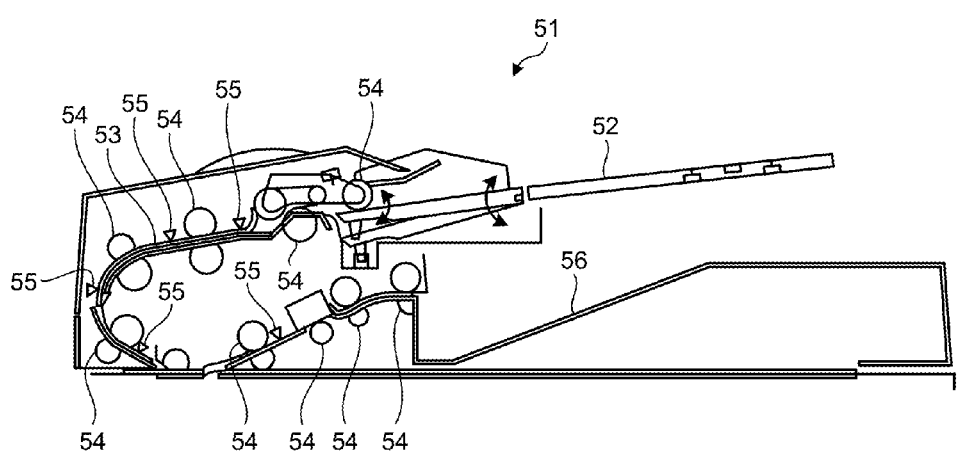
FIG. 13 is a diagram of an exemplary configuration of an auto document feeder (ADF) to which the conveyance device according to the embodiment of the present invention can be applied.

FIG. 13 illustrates an exemplary configuration of an auto document feeder (ADF) 51 to which the conveyance device 1 according to the present embodiment can be applied. The ADF 51 includes a placement unit 52, a conveyance path 53, rollers 54, sensors 55, a paper ejection tray 56, and the like. Each of the rollers 54 is rotated with a motor (not illustrated in the drawing). A piece of paper that is the conveyance object 7 placed on the placement unit 52 is conveyed with the revolution of each of the rollers 54 through the conveyance path 53. A plurality of sensors 55 is installed and fixed in the middle of the conveyance path 53. Each of the sensors 55 detects the presence or absence (passing) of the piece of paper. The position of the piece of paper can be specified based on the detection result from each of the sensors 55. The revolution speed or the like of each of the rollers 54 is controlled by the control of the motor.

The conveyance device 1 according to the present embodiment can be used as the power of the driving system configured to drive each of the rollers 54. This can implement a conveyance operation with a higher degree of accuracy than conventional. This can implement, for example, a conveyance in which the spaces among pieces of papers are closed, or a high-speed conveyance.

Figure 14:
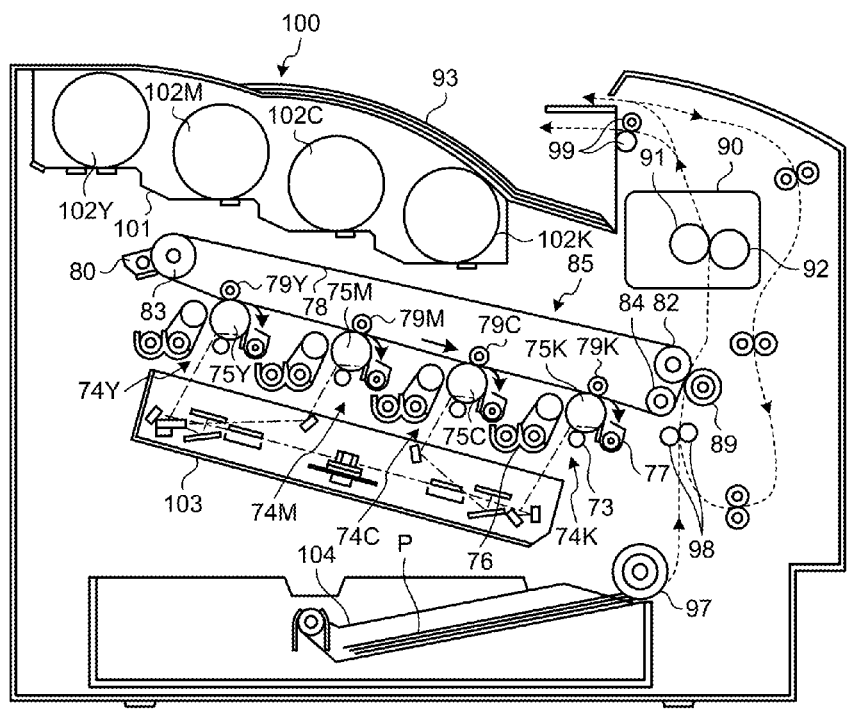
FIG. 14 is a diagram of an exemplary configuration of an image forming apparatus to which the conveyance device according to the embodiment of the present invention can be applied.

FIG. 14 illustrates an exemplary configuration of an image forming apparatus 100 to which the conveyance device 1 according to the present embodiment can be applied. The image forming apparatus 100 is a tandem color printer. Four toner bottles 102Y, 102M, 102C, and 102K corresponding to colors (yellow, magenta, cyan, black) are detachably (exchangeably) installed in a bottle housing unit 101 placed at the upper part of the body of the image forming apparatus 100.

An intermediate transfer unit 85 is placed below the bottle housing unit 101. Imaging units 74Y, 74M, 74C, and 74K corresponding to colors (yellow, magenta, cyan, black) are arranged in parallel while facing an intermediate transfer belt 78 of the intermediate transfer unit 85.

Photoreceptor drums 75Y, 75M, 75C, and 75K are placed in the imaging units 74Y, 74M, 74C, and 74K, respectively. A charging unit 73, a developing unit 76, a cleaning unit 77, a static eliminator (not illustrated in the drawings), and the like are placed around each of the photoreceptor drums 75Y, 75M, 75C, and 75K. An imaging process (charging, exposing, developing, transferring, and cleaning) is performed in each of the photoreceptor drums 75Y, 75M, 75C, and 75K to form the image of each color on each of the photoreceptor drums 75Y, 75M, 75C, and 75K.

Each of the photoreceptor drums 75Y, 75M, 75C, and 75K is rotated and driven in the clockwise direction in FIG. 14 with a driving motor (not illustrated in the drawings). Each surface of the photoreceptor drums 75Y, 75M, 75C, and 75K is uniformly charged at the position of the charging unit 73 (charging).

After that, the surface of each of the photoreceptor drums 75Y, 75M, 75C, and 75K reaches the irradiation position of a laser light emitted from an exposing unit 103 so as to form an electrostatic latent image corresponding to each color by the exposure scanning at the position (exposing).

After that, the surface of each of the photoreceptor drums 75Y, 75M, 75C, and 75K reaches the position facing a developing unit 76 so as to develop the electrostatic latent image at the position and form a toner image of each color (developing).

After that, the surface of each of the photoreceptor drums 75Y, 75M, 75C, and 75K reaches the position facing the intermediate transfer belt 78 and primary transfer bias rollers 79Y, 79M, 79C, and 79K to transfer the toner image on each of the photoreceptor drums 75Y, 75M, 75C, and 75K onto the position facing the intermediate transfer belt 78 (primary transferring). At that time, a small amount of toner that has not been transferred remains on each of the photoreceptor drums 75Y, 75M, 75C, and 75K.

After that, the surface of each of the photoreceptor drums 75Y, 75M, 75C, and 75K reaches the position facing the cleaning unit 77 such that a cleaning blade of the cleaning unit 77 mechanically recovers the toner that has not been transferred and remains on each of the photoreceptor drums 75Y, 75M, 75C, and 75K (cleaning).

At the end, the surface of each of the photoreceptor drums 75Y, 75M, 75C, and 75K reaches the position facing the static eliminator (not illustrated in the drawings) such that the residual potential on the photoreceptor drums 75Y, 75M, 75C, and 75K is removed at the position. Then, a series of procedures of the imaging process on each of the photoreceptor drums 75Y, 75M, 75C, and 75K are completed.

After that, the intermediate transfer belt 78 is overlaid with the toner image of each color formed on each of the photoreceptor drums though the developing process in order to transfer the toner image. This forms a color image on the intermediate transfer belt 78.

In that case, the intermediate transfer unit 85 includes the intermediate transfer belt 78, the four primary transfer bias rollers 79Y, 79M, 79C, and 79K, a secondary transfer backup roller 82, a cleaning backup roller 83, a tension roller 84, and an intermediate transfer cleaning unit 80. The intermediate transfer belt 78 is extended and supported with three rollers 82 to 84, and is endlessly moved in the direction of the arrow in FIG. 14 with the revolution driving of the roller 82.

The four primary transfer bias rollers 79Y, 79M, 79C, and 79K form a primary transfer nip while holding the intermediate transfer belt 78 with the photoreceptor drums 75Y, 75M, 75C, and 75K. Then, a transfer bias opposite to the polarity of the toner is applied on the primary transfer bias rollers 79Y, 79M, 79C, and 79K.

Then, the intermediate transfer belt 78 runs in the arrow direction and sequentially passes the primary transfer nips of the primary transfer bias rollers 79Y, 79M, 79C, and 79K. As described above, the intermediate transfer belt 78 is overlaid with the toner images of the colors on the photoreceptor drums 75Y, 75M, 75C, and 75K as the primary transferring.

After that, the intermediate transfer belt 78 on which the overlaid toner images of the colors are transferred reaches the position facing a secondary transfer roller 89. The secondary transfer backup roller 82 forms a secondary transfer nip at the position while holding the intermediate transfer belt 78 with the secondary transfer roller 89. The four-color toner image formed on the intermediate transfer belt 78 is transferred on a recording medium P conveyed to the position of the secondary transfer nip. At that time, toner that has not been transferred on the recording medium P remains on the intermediate transfer belt 78.

After that, the intermediate transfer belt 78 reaches the position of the intermediate transfer cleaning unit 80. Then, the toner that has not been transferred on the recording medium P on the intermediate transfer belt 78 is recovered at the position. As a result, a series of procedures of the transferring process on the intermediate transfer belt 78 are completed.

In that case, the recording medium P has been conveyed to the position of the secondary transfer nip from a paper feeding unit 104 placed at the lower part of the image forming apparatus 100 through a paper feeding roller 97 and a pair of registration rollers 98.

In detail, a plurality of recoding mediums P, such as pieces of transfer paper, is housed in the paper feeding unit 104 while being overlaid with each other. Rotating and driving the paper feeding roller 97 in the counterclockwise direction in FIG. 14 feeds the top of the recoding mediums P toward the space between the pair of registration rollers 98.

The recoding medium P fed to the pair of registration rollers 98 temporarily stops at the position of a roller nip of the pair of registration rollers 98 of which rotation driving has been stopped. Then, the pair of registration rollers 98 is rotated and driven in synchronization with the timing of the color image on the intermediate transfer belt 78 so as to convey the recording medium P toward the second transfer nip. This transfers a desired color image on the recording medium P.

After that, the recording medium P on which the color image has been transferred at the position of the secondary transfer nip is conveyed to the position of a fixing device 90. Then, the color image transferred on the surface of the recording medium P is fixed on the recording medium P at the position by the heat of a fixing roller 91 and the pressure of a pressurizing roller 92.

After that, the recording medium P is ejected outside the apparatus through the space between a pair of paper ejection rollers 99. The recording mediums P ejected outside the apparatus using pair of paper ejection rollers 99 are sequentially stacked as output images on a stack unit 93. As described above, a series of procedures of the image forming process in the image forming apparatus 100 is completed.

The conveyance device 1 according to the present embodiment can be used as the power of the driving system configured to drive the pair of registration rollers 98 or each of the rollers in the paper conveyance system (for example, the paper feeding roller 97). This can implement a conveyance operation with a higher degree of accuracy than conventional and can implement, for example, a conveyance in which the spaces among pieces of papers are closed, or a high-speed conveyance.

The conveyance device according to the present embodiment controls the revolution speed of the motor using the fixed reference position information indicating the installation position of the sensor. This can improve the controllability on the motor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conveyance device comprising:
   a conveyance unit configured to convey a conveyance object in a conveyance path;
   a motor configured to drive the conveyance unit;
   a sensor configured to detect a position of the conveyance object, the sensor being fixed in the conveyance path;
   an instruction unit configured to generate an instruction signal for conveying the conveyance object to a target position; and
   a control unit configured to
      control the motor by performing a speed feedback control based on the instruction signal, motor revolution speed information, the position of the conveyance object, and reference position information including an installation position of the sensor, and
      increase a rotational speed of the motor so as to cancel a delay between a time when the position of the conveyance object is detected by the sensor and a time when the speed feedback control is reflected on the motor on the basis of the installation position of the sensor.

2. The conveyance device according to claim 1,
   wherein, when a difference between the position of the conveyance object and the target position becomes equal to or less than a threshold, the control unit controls the motor by performing a position feedback control based on the position information about the motor and a predetermined designated number of pulses such that a period from a time when the difference becomes equal to or less than the threshold to a time when the conveyance object reaches the target position is kept constant.

3. The conveyance device according to claim 2,
   wherein the control unit generates a target position per a controlling cycle on the basis of the designated number of pulses.

4. The conveyance device according to claim 1, further comprising:
   a first control unit and a second control unit that are hardware independent from each other,
   wherein the first control unit includes the instruction unit, and
   the second control unit includes the control unit.

5. The conveyance device according to claim 1,
   wherein the control unit determines whether the instruction signal includes a request for a control based on the reference position information and, when the request is not included, controls the motor without consideration of the reference position information.

6. The conveyance device according to claim 1,
   wherein, when the conveyance unit or the motor changes a position thereof together with the conveyance object, the sensor detects the position of the conveyance object on the basis of the position of the conveyance unit or the motor.

7. The conveyance device according to claim 1, used for an automatic paper feeding device in an image forming apparatus.

8. The conveyance device of claim 1, wherein the installation position of the sensor is stored in a random access memory (RAM) associated with the control unit.

9. A method for controlling a conveyance device, comprising:
   generating an instruction signal for conveying a conveyance object to a target position, the conveyance object conveyed along a conveyance path by a conveyance unit;
   controlling a motor for driving the conveyance unit by performing a speed feedback control based on the instruction signal, motor revolution speed information, position information about the conveyance object, and a reference position information including an installation position of a sensor, and
   increasing a rotational speed of the motor so as to cancel a delay between a time when the position of the conveyance object is detected by the sensor and a time when the speed feedback control is reflected on the motor on the basis of the installation position of the sensor.

10. The method of claim 9, wherein the controlling is performed by a controller, and the installation position of the sensor is stored in a random access memory (RAM) associated with the controller.

11. A computer program product comprising a non-transitory computer-readable storage medium storing computer-readable program codes for controlling a conveyance device, the program codes causing a computer to execute:
    generating an instruction signal for conveying a conveyance object to a target position, the conveyance object conveyed along a conveyance path by a conveyance unit;
    controlling a motor for driving the conveyance unit by performing a speed feedback control based on the instruction signal, motor revolution speed information, position information about the conveyance object, and reference position information including an installation position of the sensor, and
    increasing a rotational speed of the motor so as to cancel a delay between a time when the position of the conveyance object is detected by the sensor and a time when the speed feedback control is reflected on the motor on the basis of the installation position of the sensor.

12. The computer program product of claim 11, wherein the installation position of the sensor is stored in a random access memory (RAM) associated with the controller.

* * * * *